F. K. COCHRAN.
SAFETY FENDER FOR CAR WHEELS.
APPLICATION FILED JUNE 20, 1921.
1,416,610.
Patented May 16, 1922.
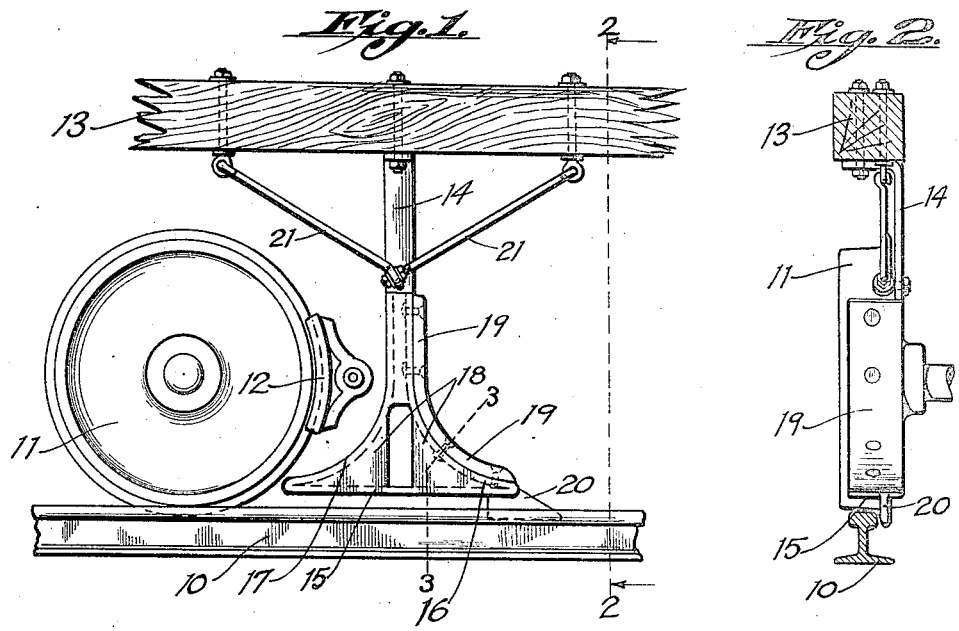
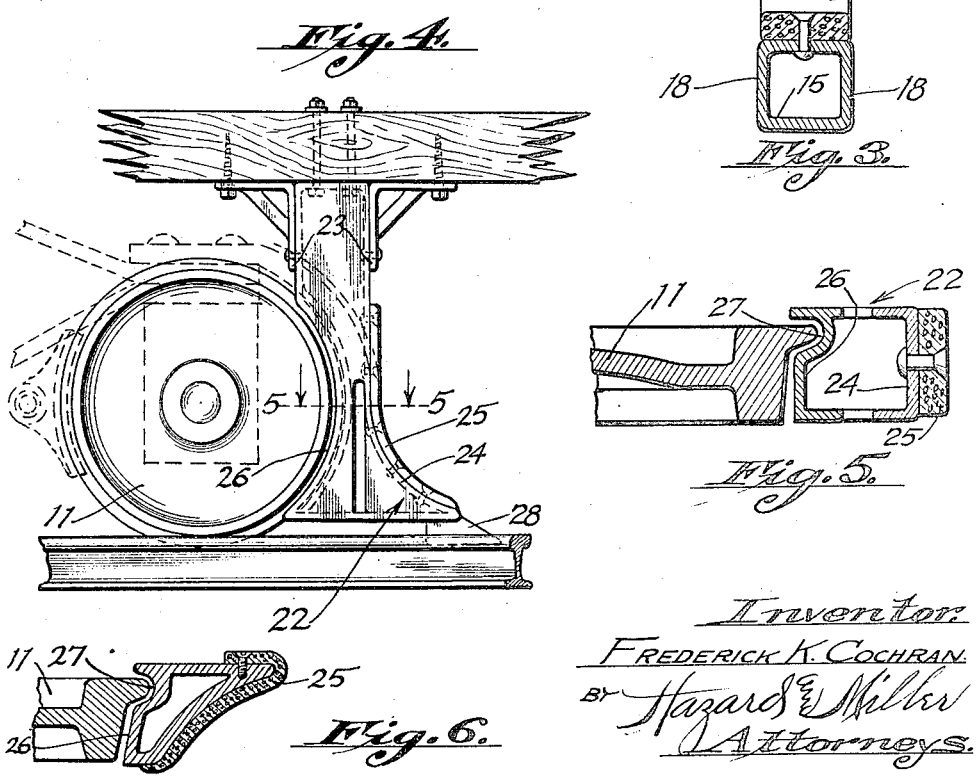
Inventor:
FREDERICK K. COCHRAN.
By Hazard & Miller
Attorneys.

UNITED STATES PATENT OFFICE.

FREDERICK K. COCHRAN, OF LOS ANGELES, CALIFORNIA.

SAFETY FENDER FOR CAR WHEELS.

1,416,610.                    Specification of Letters Patent.    Patented May 16, 1922.

Application filed June 20, 1921. Serial No. 479,011.

*To all whom it may concern:*

Be it known that I, FREDERICK K. COCHRAN, a citizen of the United States, residing at Los Angeles, in the county of Los Angeles and State of California, have invented new and useful Improvements in Safety Fenders for Car Wheels, of which the following is a specification.

My invention relates to new and useful improvements in safety devices and more particularly to a device in the nature of a fender that is adapted to be positioned immediately in front of a car wheel, in which position it will engage an object or body lying on the rail and move the same forwardly and to one side, and consequently preventing said object or body from being struck and injured by the car wheel.

The principal objects of my invention are to provide a relatively simple and efficient safety device that is capable of being easily and cheaply produced, readily applied for use, applicable in connection with car trucks having either inside or outside-hung brake beams, and to provide a safety fender that will very effectively perform its intended functions.

A further object of my invention is to provide a safety fender with a buffer or covering of yielding resilient material, such as rubber, in order to provide a cushioning effect when an object or body is engaged by the fender.

With the foregoing and other objects in view, my invention consists in certain novel features of construction and arrangement of parts that will be hereinafter more fully described and claimed, and illustrated in the accompanying drawings, in which:

Fig. 1 is a fragmental side elevational view of a car truck having outside-hung brake beams and showing my improved safety fender applied to said truck and positioned in front of the lead wheel thereof.

Fig. 2 is a vertical section taken on the line 2—2 of Fig. 1 and showing the safety fender in front elevation.

Fig. 3 is an enlarged cross section taken approximately on the line 3—3 of Fig. 1.

Fig. 4 is an elevational view of the form of safety fender that is applied to the wheels of trucks having inside-hung brake beams.

Fig. 5 is an enlarged horizontal section taken approximately on the line 5—5 of Fig. 4.

Fig. 6 is a detail section similar to Fig. 5 and showing a modified arrangement of the cushion on the body of the fender.

Referring by numerals to the accompanying drawings, and particularly to the construction illustrated in Figs. 1–3 inclusive, 10 designates a portion of a track rail, 11 one of the car wheels, 12 the outside-hung brake beam and 13 a portion of the truck or car body.

My improved safety fender includes a vertically disposed arm 14, the upper end of which is secured in any suitable manner to the truck frame or car body 13 at a point immediately in front of the car wheel, and formed integral with or fixed to the lower portion of said arm is a substantially hollow fending device, preferably formed of metal and comprising a horizontally disposed bottom plate 15 that occupies a position a slight distance above the tread surface of the rail 10 and said bottom plate extending approximately equal distances in front and to the rear of the lower end of arm 14.

Formed integral with the end portions of said bottom plate and extending upwardly and inwardly, are curved metal plates 16 and 17, the former occupying a position at the front of the safety fender and the latter being positioned immediately in front of the adjacent wheel 11.

Suitable side plates 18 connect the edges of the bottom plate 15 and curved plates 16 and 17, and positioned on top of the curved plate 16 and extending the full length thereof, is a buffer 19, preferably constructed of rubber or analogous yielding resilient material and the same being retained on said member 16 in any suitable manner, either by rivets as shown, or by grips or metallic bands that surround the curved plate 16 and the buffer member.

Depending from the inner edge and forward end of the bottom plate 15, is a forwardly projecting triangular lug or flange 20, that normally occupies a position immediately adjacent to the inner face of the ball of the rail, and said lug or flange being for the purpose of preventing any portion of an object or body that is struck from passing between the bottom plate of the safety fender and the track rail 10.

The lower ends of suitable diagonally disposed brace members 21 are secured in any suitable manner to the intermediate portion of vertical arm 14 and the upper outer ends of said brace members being secured to the truck frame or car body at points spaced apart from the upper end of said arm 14.

This construction very effectively braces the safety fender and distributes the strains when the lower portion of said safety fender engages an object or body.

In the form of safety fender illustrated in Figs. 4 and 5, and which is applied to trucks having inside-hung brake beams, a substantially hollow fending member 22 is carried by the lower ends of vertically disposed arms such as 23 and the latter being secured and braced to the car truck or car body in any suitable manner.

The fending member 22 is provided with a curved front plate 24, upon the front side of which is secured a buffer or cushioning member 25, of rubber or analogous material, and the rear portion of said fending member is provided with a curved plate 26 that is disposed immediately adjacent to the periphery of the wheel to which the device is applied and the inner edge of said plate being curved transversely as designated by 27 in order to fit over the front of the inside of the flange of the car wheel. (See Fig. 5.)

Thus the entire front portion of the wheel is provided with a guard and the curved front side of the fending device is provided with a yielding buffer that tends to cushion the impact between the fending device and an object or body with which it engages.

Depending from the inner edge and front end of the base portion of the body 22 of the fender, is a short plug or flange 28 that performs the same functions as the lug or flange 20 previously described.

In some instances it may be found desirable to extend the upper portion of the fender upwardly and rearwardly over the car wheel as illustrated by dotted lines in Fig. 4, and, where such construction is employed, the upper portion of the fender is directly connected to the upper portion of the car truck, above the wheel.

In Fig. 6 I have shown the fender as being substantially triangular in cross section, with its inclined face outwardly presented and covered by a cushion or buffer of rubber, and such construction is effective in tending to push an object or body sidewise off the track and preventing said body from being dragged over the track by the fender.

A safety fender of my improved construction is comparatively simple, is capable of being easily and cheaply produced, is applicable to the wheels of street and railway cars and provides a very efficient safety device, in that it effectively prevents an object or body lying on the car track from being struck by the car wheels.

Obviously, minor changes in the size, form and construction of the various parts of my improved safety fender for car wheels may be made and substituted for those herein shown and described without departing from the spirit of my invention, the scope of which is set forth in the appended claims.

I claim as my invention:

1. A safety fender for car wheels comprising a vertically disposed arm adapted to be attached to a part of a car, a substantially hollow fender carried by the lower portion of said arm and adapted to be disposed immediately in front of a car wheel and above the track rail upon which said wheel operates, the front portion of said fender being curved, and a flange depending from the inner edge of the front end of said fender which flange extends downwardly below the plane occupied by the tread portion of the rail above which the fender is positioned.

2. A safety fender for car wheels comprising a vertically disposed arm adapted to be attached to a part of a car, a substantially hollow fender carried by the lower portion of said arm and adapted to be disposed immediately in front of a car wheel and above the track rail upon which said wheel operates, the front portion of said fender being curved, a cushion of resilient material arranged on said curved front portion, and a flange depending from the front inner edge of said fender.

3. A safety fender for car wheels comprising a substantially hollow fender body having a curved rear portion that is adapted to overlie the periphery of a car wheel, the front side of said fender body being curved and having its lower portion extended forwardly, and a cushion of resilient material applied to the curved front portion of said fender.

4. A safety fender for car wheels comprising a substantially hollow fender body having a curved rear portion that is adapted to overlie the periphery of a car wheel, the front side of said fender body being curved and having its lower portion extended forwardly, a cushion of resilient material applied to the curved front portion of said fender, and a flange depending from the front inner edge of the body of the fender.

5. A safety fender for car wheels comprising a substantially hollow fender body having curved front and rear portions and adapted to be positioned immediately in front of a car wheel, means for securing said fender body to a part of the car, and a cushioning member of resilient material positioned on the curved front side of said fender.

In testimony whereof I have signed my name to this specification.

FREDERICK K. COCHRAN.